US012036817B2

(12) United States Patent
Ito et al.

(10) Patent No.: US 12,036,817 B2
(45) Date of Patent: Jul. 16, 2024

(54) THREE-DIMENSIONAL EFFECT ON EDGE OF MULTI-PAGE DOCUMENT

(71) Applicant: Adobe Inc., San Jose, CA (US)

(72) Inventors: Daichi Ito, San Jose, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/084,361

(22) Filed: Dec. 19, 2022

(65) Prior Publication Data

US 2024/0198720 A1 Jun. 20, 2024

(51) Int. Cl.

| | |
|---|---|
| ***B44F 7/00*** | (2006.01) |
| ***B42C 1/00*** | (2006.01) |
| ***B42D 1/00*** | (2006.01) |

(52) U.S. Cl.

CPC .................. *B44F 7/00* (2013.01); *B42C 1/00* (2013.01); *B42D 1/003* (2013.01); *B42D 1/009* (2013.01)

(58) Field of Classification Search

CPC .................................. B44F 7/00; B42D 1/009

See application file for complete search history.

(56) References Cited

FOREIGN PATENT DOCUMENTS

| | | | | | |
|---|---|---|---|---|---|
| CN | 111591066 | A | * | 8/2020 | |
| KR | 20150022746 | A | * | 3/2015 | |
| KR | 20170139974 | A | * | 12/2017 | |
| WO | WO-0160630 | A1 | * | 8/2001 | B41M 3/00 |
| WO | WO-2018139754 | A1 | * | 8/2018 | B42D 15/00 |

* cited by examiner

*Primary Examiner* — Kyle R Grabowski

(74) *Attorney, Agent, or Firm* — Shook, Hardy & Bacon L.L.P.

(57) ABSTRACT

Methods and systems are provided for a three-dimensional effect on the edge of a multi-page document (e.g., a book). In one embodiment, a first set of image slices associated with a left-eye image is printed on a first side of long pages of a multi-page document. The first set of image slices printed adjacent to edges of the long pages. A second set of image slices associated with a right-eye image is printed on a second side of the long pages of the multi-page document. The second set of image slices printed adjacent to the edges of the long pages. Thereafter, the multi-page document is created by interleaving the long pages with short pages to enable visibility of the first set of image slices and the second set of image slices printed adjacent to the edges of the long pages.

20 Claims, 14 Drawing Sheets

THREE-DIMENSIONAL EFFECT ON EDGE OF MULTI-PAGE DOCUMENT

BACKGROUND

Books, manuals, and other multi-page documents can include imaging on the front and/or back of the multi-page document. For example, the front cover of a book may include text or a graphic to provide information to a viewer and/or in an effort to seek the attention of a viewer. In cases of some multi-page documents, such as books, the spine portion of the book may also include imaging. For example, the title of the book may be printed on the spine portion of the book. Non-spine edges of a multi-page document, however, typically do not include any imaging. To the extent imaging is provided on non-spine edges, such imaging is generally presented in a two-dimensional form.

SUMMARY

Embodiments disclosed herein are directed to facilitating a three-dimensional effect on an edge of a multi-page document, such as a book. The technology described herein provides a technique to print three-dimensional effects on an edge of a multi-page document. Advantageously, a three-dimensional effect is provided without requiring any particular paper, ink, lens for viewing, etc.

Generally, in accordance with embodiments described herein, a multi-page document is generated or produced with at least one edge (non-binding edge) having an image presented with a three-dimensional effect. To generate a three-dimensional effect, an image can be rendered as a stereo pair of images that includes one image intended to be viewed by the right eye and another image intended to be viewed by the left eye. Both the right-eye image and the left-eye image can be sliced or divided into portions intended for different pages of the multi-page book. To provide a three-dimensional effect, the right-eye image slices are printed on an edge on one side of pages (e.g., front edges of pages), and the left-eye image slices are printed on an edge on the other side of the pages (e.g., back edges of pages). To enable a viewer to view the printed edges such that they are not covered up by the adjacent page, embodiments described herein include shorter pages interleaved between the longer pages having the printed right-eye image slices and left-eye image slices.

DETAILED DESCRIPTION

Figure 1C:
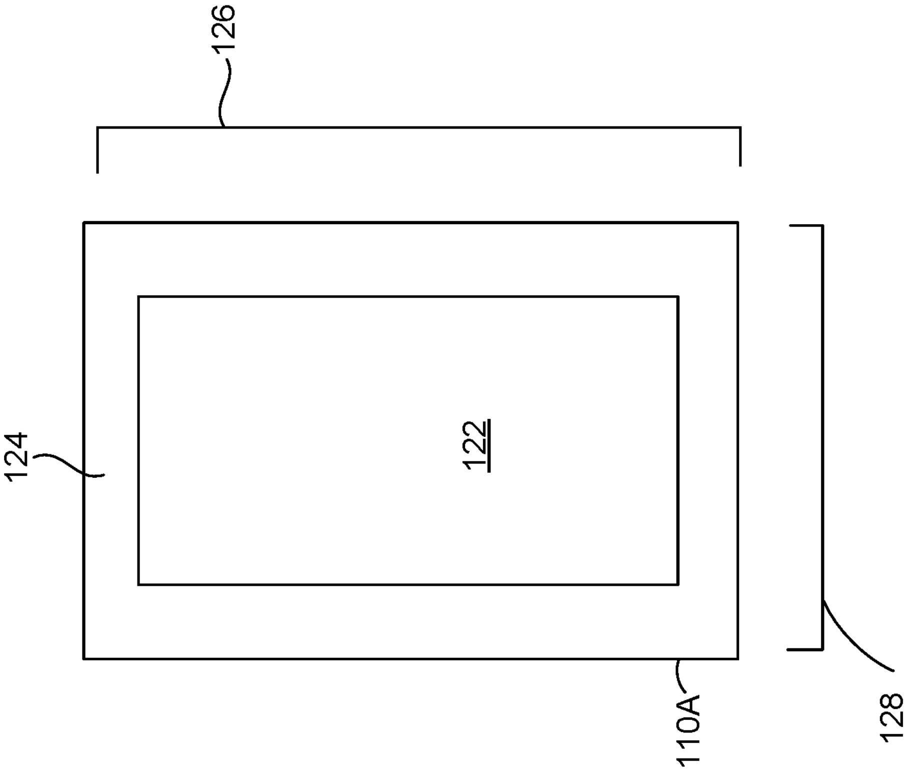
FIG. 1C provides a view of a page of a multi-page document.

Books, manuals, and other multi-page documents can include imaging on the front and/or back of the multi-page document. For example, the front cover of a book may include text or a graphic to provide information to a viewer and/or in an effort to seek the attention of a viewer. In cases of some multi-page documents, such as books, the spine portion of the book may also include imaging. For example, the title of the book may be printed on the spine portion of the book. Non-spine edges of a multi-page document, however, typically do not include any imaging. To the extent imaging is provided on non-spine edges, such imaging is generally presented in a two-dimensional form.

As electronic versions of multi-page documents, such as books, has increased, the printed publications of such documents has decreased. As such, physical attributes of multi-page documents that can draw viewer attention may be desired to attract interest in physical documents, for example, displayed in a bookstore or library.

As such, embodiments disclosed herein are directed to facilitating a three-dimensional effect on an edge of a multi-page document, such as a book. As described herein, the multi-page document refers to a physical document (as opposed to an electronic or digital document) with multiple pages that can be manually turned by an individual. The technology described herein provides a technique to print three-dimensional effects on an edge of a multi-page document. For example, when a viewer views the edge of a book (e.g., from 5-20 inches distance), a two-dimensional image printed on the edge appears as though it is a three-dimensional image, or object. Advantageously, a three-dimensional effect is provided without requiring any particular paper, ink, lens for viewing, etc.

Generally, in accordance with embodiments described herein, a multi-page document is generated or produced with at least one edge (non-binding edge) having an image presented with a three-dimensional effect. In some embodiments, the edge opposite of a bound edge may be the edge presenting the image with the three-dimensional effect. To generate a three-dimensional effect, an image can be rendered as a stereo pair of images that includes one image intended to be viewed by the right eye and another image intended to be viewed by the left eye. Both the right-eye image and the left-eye image can be sliced or divided into portions intended for different pages of the multi-page book. To provide a three-dimensional effect, the right-eye image slices are printed on an edge on one side of pages (e.g., front edges of pages), and the left-eye image slices are printed on an edge on the other side of the pages (e.g., back edges of pages). In this way, the right eye views the right-eye image slices and the left eye views the left-eye image slices, as intended to generate the three-dimensional effect. For purposes of illustration, and with brief reference to FIG. 1B, the right eye 132 of a viewer can view the image slice 130 printed on one side of the page (front edge of a page), while the left eye 136 of the viewer can view the image slice 134 printed on the other side of a page (e.g., back edges of a page). To enable a viewer to view the printed edges such that they are not covered up by the adjacent page, embodiments described herein include shorter pages interleaved between the longer pages having the printed right-eye image slices and left-eye image slices. Various aspects are described herein to facilitate an effective three-dimensional effect, such as, for example, reflection offsetting to reduce the effect of reflections that would occur between adjacent pages.

Although generally described herein as facilitating a three-dimensional effect, in embodiments, a three-frame animation can be provided via the edge of a multi-dimensional object. In this regard, as a user perspective changes relative to the multi-page document, an object may appear to move. For example, as the user's viewing angle changes, a viewer can see a first image, a second image, and a third image as animation sequences.

Figure 1A:
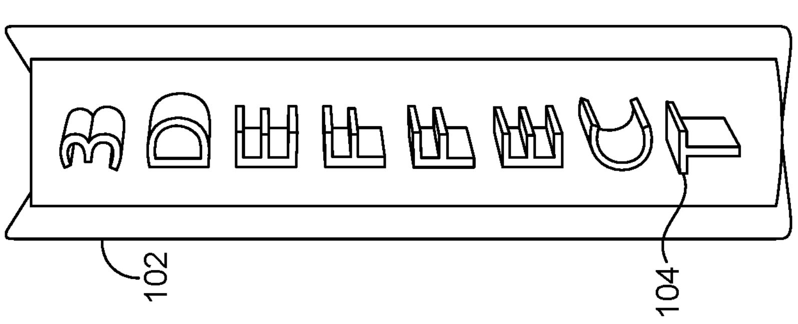
FIG. 1A depicts an example multi-page document with an image on the edge having a three-dimensional effect.

With reference to FIG. 1A, a multi-page document 102 (e.g., a book) includes an image 104 with a three-dimensional effect. Such a three-dimensional effect can be revealed when the multi-page document is in a closed position, as shown in FIG. 1A, and/or when one bends and/or manipulates the pages. As described, the three-dimensional effect of the image on the edge can facilitate interest and engagement with the multi-page document 102. The image displayed on the edge of the book can be any image and may include any text, graphics, pictures, etc.

Figure 1B:
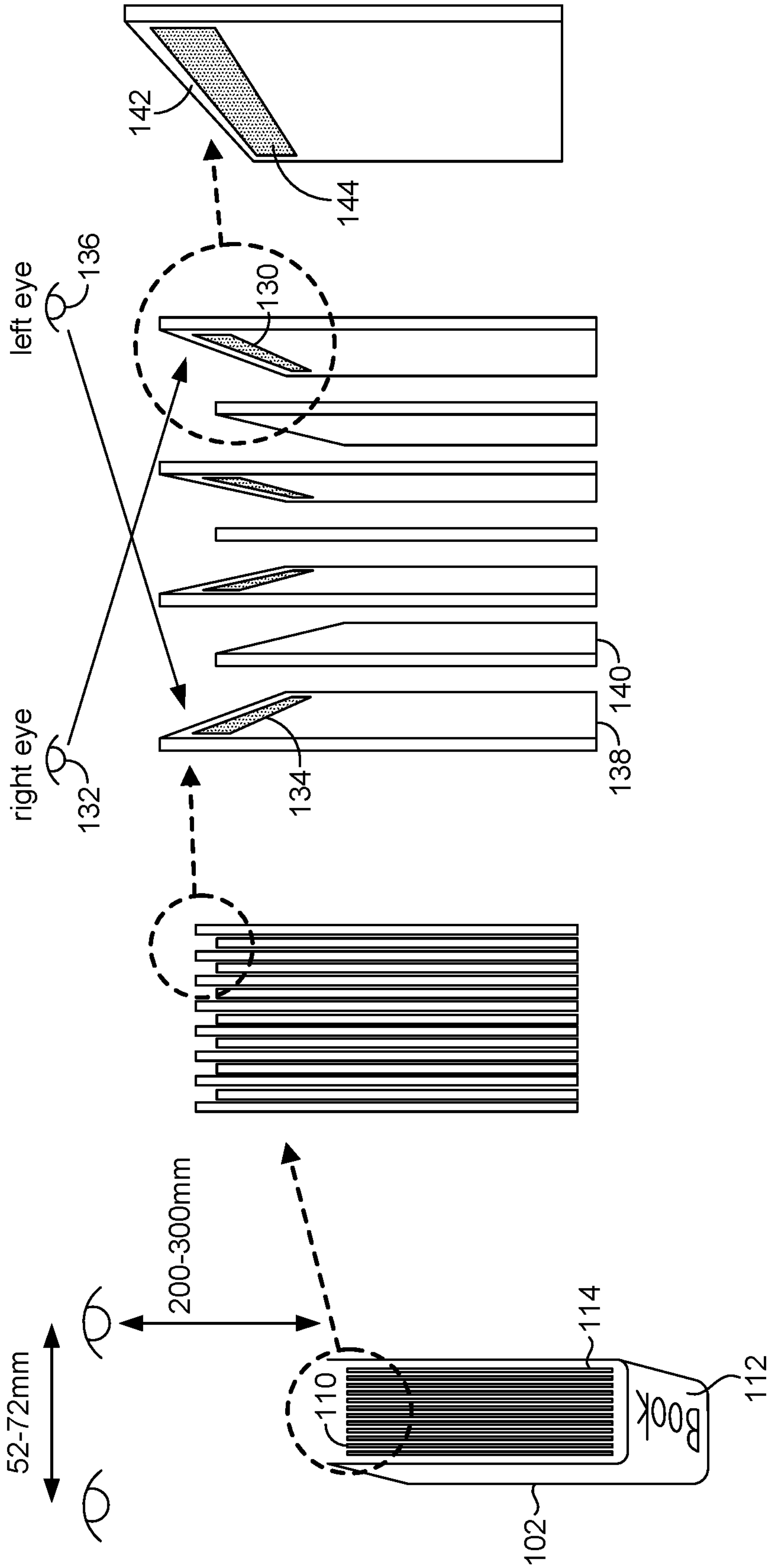
FIG. 1B depicts an example multi-page document with pages illustrating the technique for accomplishing a three-dimensional effect.

As shown in FIG. 1B, a multi-page document 102 generally includes a plurality of pages 110 that are attached to one another by a binding 112, which can include at least one staple, a ring binder, glue, or other manners for attaching pages of a document together, at a spine. As depicted in FIG. 1B, the multi-page document 110 is bound at or adjacent edge 114 of the pages. Although FIG. 1B illustrates a multi-page document generally bound along the entire edge (i.e., bound edge) of each page, the entire edge of each page need not be bound. For example, in some cases, only a portion of each edge might be bound. Generally, the multi-page document 102 can be described as including a thickness t, a height h, and a width w. In one example, the height can be approximately 11 inches, the width can be approximately 8½ inches, and the thickness is based on the number of pages of the multi-page document (e.g., each page may be 0.1 mm thick). Each page of the multi-page document 102 has four edges. In alternative embodiments, however, the pages can take other configurations and the pages can have more or less edges.

FIG. 1C illustrates an example page 110A of the set of pages 110. Text, or other images, are typically printed in a central region 122 of a page 110A. Page 110A is one example of a page of the set of pages 110 in the multi-page document 102. Page 110A is presented with a height 126 and a width 128. A margin 124 surrounds the central region 122 of the page 110A. The margin 124 can include a lower margin, an upper margin, a left margin and a right margin. As described herein, the left-eye image and/or the right-eye image can be printed in the margin along the edge for which the image having the three-dimensional effect is desired. For instance, assume the page 110A is bound on the left side and an image is desired to be presented with a three-dimensional effect on the opposite edge. In such a case, the appropriate images may be printed in the right margin, as described in more detail herein.

To provide a three-dimensional effect of an image on the edge of a multi-page document, such as image 104 on multi-page document 102 of FIG. 1A, a two-dimensional image is printed on pages of the multi-page document to appear as if it is a three-dimensional image or object. In particular, to effectuate the three-dimensional effect, stereo pair images, including a right-eye image and a left-eye image, are generated and used to print the desired image on the front edge and back edge (in the margins) of the papers of the multi-page document. In this regard, a right-eye image of the stereo pair image is printed one side of the page (e.g., front edge) to render a three-dimensional image from the right-eye position, and a left-eye image of the stereo pair image is printed on the other side of the page (e.g., back edge) to render a three-dimensional image from the left-eye position. For example, as shown in FIG. 1B, a portion 130 of a right-eye image is printed on one side of a page edge such that it is viewed from a viewer's right eye 132, and a portion 134 of a left-eye image is printed on another side of a page edge such that it is viewed from the viewer's left eye 136. Although generally described herein as printing the image along an edge opposite the binding 112, another non-binding edge of the multi-page document 102 may be used for printing an image. For example, in some cases, for a multi-page document having four edges with one edge bound, images may be printed on any of the other three edges to provide a three-dimensional effect.

To view the printed images without bending the pages, one or more pages between the pages with print are shorter in width (e.g., width 128 of FIG. 1C). In this way, the shorter pages enable a user to view a three-dimensional effect. For example, as shown in FIG. 1B, longer pages 138 can have print of portions of the image on the exposed front edge and/or back edge. Shorter pages 140 can be interleaved between the longer pages 138 such that the images printed on the front and/or back edges of the longer pages are viewable, thereby providing the three-dimensional effect. Generally, the longer pages are longer than the shorter pages in a distance relative to the edge on which the image and three-dimensional effect are presented. For instance, assume an image having a three-dimensional effect is intended to be presented on the edge opposite of the bound edges of the pages. In this case, the longer pages have a longer width as compared to the shorter pages. Further, to prevent an unintended eye from viewing an image slice (e.g., a right eye viewing a left-eye image slice), the printed image slice may be positioned slightly away from the edge of the page. For example, a small gap 142 may be maintained between the edge of the page and the printed image slice 144.

Figure 2:
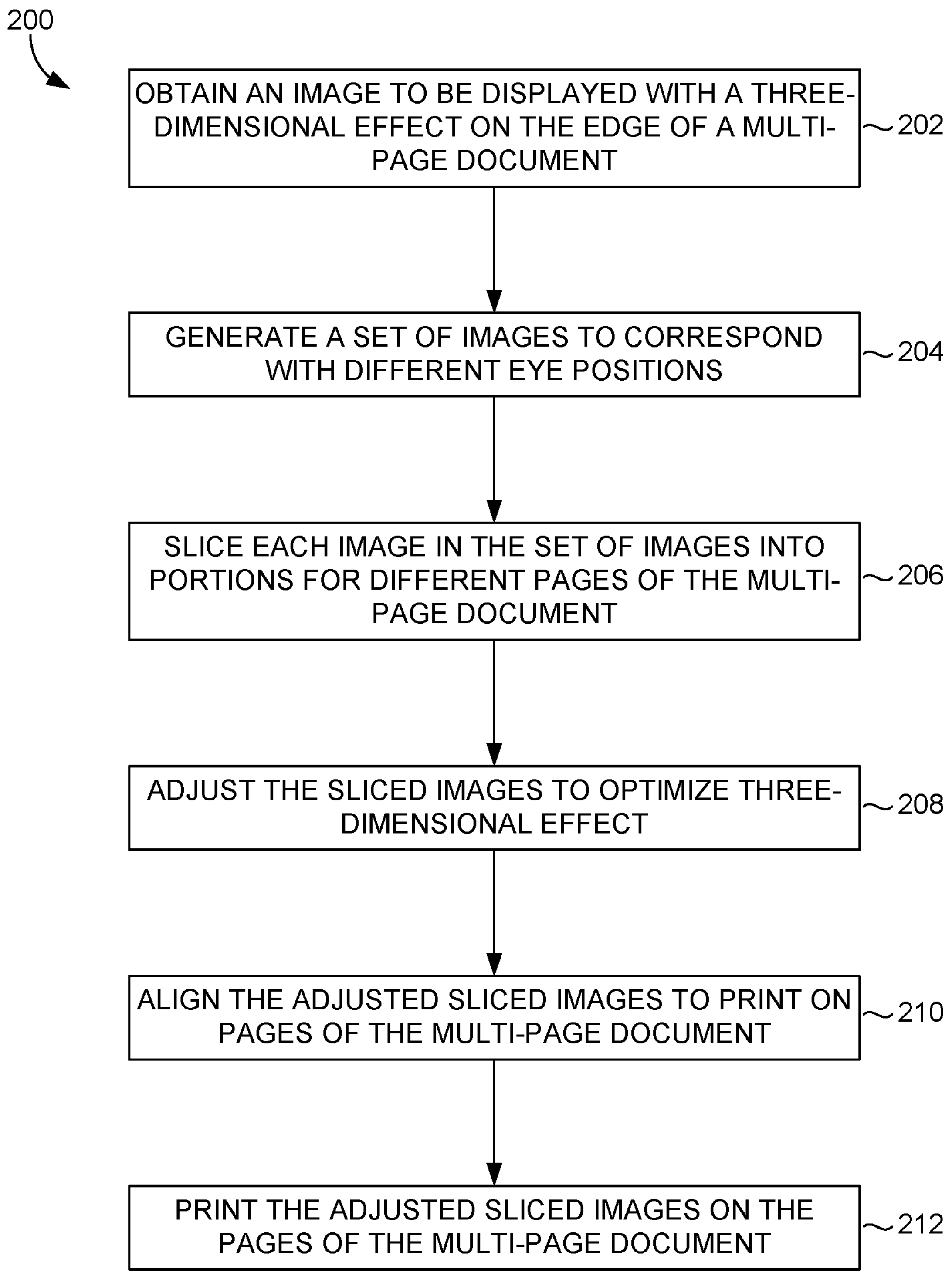
FIG. 2 provides an illustrative method flow for facilitating a three-dimensional effect on an edge of a multi-page document.

FIG. 2 provides a method 200 for implementing a three-dimensional effect on the edge of a multi-page document. Initially, at block 202, an image desired to be displayed, as having a three-dimensional effect on the edge of a multi-page document, is obtained. As described, the image may include any type of text, graphics, pictures, etc. The image can be input in any of a number of ways, including via a keyboard, a scanner, a selected file that is stored on a medium, an image upload, etc.

Figure 3A:
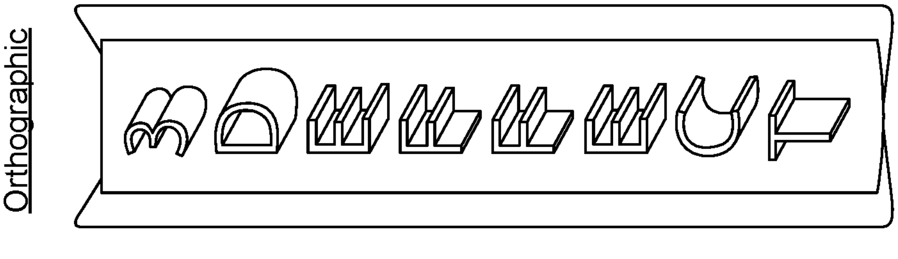
FIG. 3A provides an example of orthographic projection.
Figure 3B:
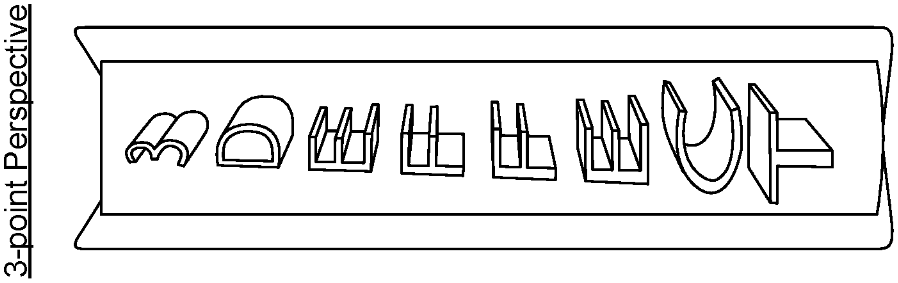
FIG. 3B provides an example of three-point perspective projection.
Figure 3C:
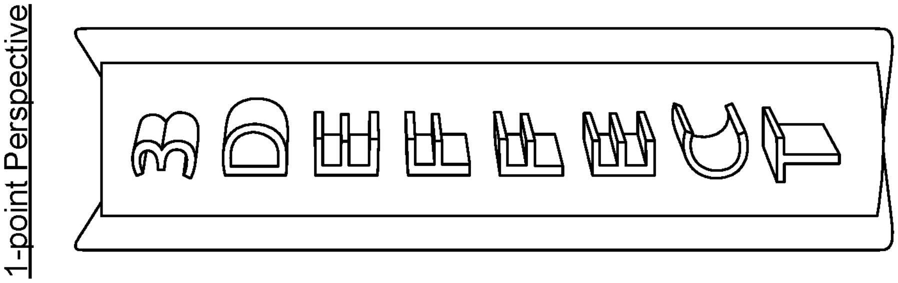
FIG. 3C provides an example of one-point perspective projection.

In some cases, the image may be modified so as to appear in three dimensions, in accordance with embodiments described herein. One example technology that may be used to modify the image such that is appears in three dimensions is orthographic projection. Orthographic projection, or orthogonal projection, is used to represent three-dimensional objects in two dimensions. Orthographic projection may include a form of parallel projection, in which project lines are orthogonal to the projection plane, resulting in planes of the object appearing in affine transformation of the viewing surface. FIG. 3A provides an example of an orthographic projection. Another example technology that may be used to modify the image such that it appears in three dimensions is a three-point perspective projection. The three-point perspective projection provides a three-point perspective, that is, a visual effect in which parallel lines converge on a vanishing point. With three-point perspective, the effect provides perception of real objects by the human eye or a camera. In this regard, objects that are further away are displayed as smaller. FIG. 3B provides an example of a three-point perspective projection. In this example, if the camera is closer to the letter "T," the "3" would be further away from the camera and, as such, appears smaller. Another example technology that may be used to modify the image such that it appears in three dimensions is one-point perspective projection. With one-point perspective projection, any of principal axes intersects with projection plane, or the projection plan is perpendicular to the principal axis. In this regard, one axis intersects the projection plane, while the other two axes are parallel to the projection plane. FIG. 3C provides an example of a one-point perspective projection. Each of such projections (e.g., orthographic, three-point perspective, and one-point perspective) provides effective three-dimensional effects. In some cases, one-point perspective projection is selected for image modification. With orthographic images, an object further away from the eye may not become smaller. One-point perspective, however, maintains the "perspective" notion in the image (e.g., the root of the letters in this case is smaller than the top of the letters.) With three-point perspective, as described above, when the viewer's eye is closer to the "T," "T" should look bigger than the "3." However, "T" may not be desired to be printed as a bigger object. If "3" and "T" are printed as the same size, and if a viewer's eye is closer to the "T," the viewer sees "T" bigger than the "3" already and accordingly in the real space. As such, in some cases, it may be desirable to print the same size objects on the printed surface. Accordingly, one-point perspective may be desirable to attain a desired effect.

At block 204, a set of images is generated to correspond with different eye positions. To this end, the obtained image (e.g., the modified image) to display on the edge of the multi-page document is rendered to correspond with right and left eye positions. In this regard, a stereo pair of images can be created. A stereo-pair image contains two views of an image side by side. One of the views, or images, is intended for the left eye, and the other view, or image, is intended for the right eye. As described herein, one image (e.g., left-eye image) is used to be printed on one side (e.g., front side edge) of longer pages of a multi-page document, while the other image (e.g., right-eye image) is used to be printed on the other side (e.g. back side edge) of longer pages of the multi-page document. In this way, the right eye views one of the images on one side of the pages, and the left eye views the other image on the other side of the pages. As described, the shorter pages are positioned in between the longer pages to enable the images to be viewed.

As described, in some embodiments, a center image may be used. For example, a center image may be printed across the shorter pages of the multi-page document. In such cases, the center image can also be generated or obtained (e.g., in a same or similar manner as that used to generate a stereo pair of images).

In some cases, a blur filter (e.g., a small vertical blur filter) may be applied to the various images (e.g., left-eye image, right-eye image, and/or center image). A blur filter can smooth transitions, for example, by averaging the color values of pixels next to hard edges of defined lines and shaded areas. As can be appreciated, a blur filter can facilitate prevention of aliasing. By way of example, an image may appear crisp when viewed from one angle, while it appears aliasing (e.g., jagged edges) when viewed from a different angle. To avoid an aliasing effect, a blur filter can be applied to blur the image. Blur filters may be of any type, such as, for example, a box blur, a Gaussian blur, etc. As can be appreciated, other antialiasing approaches may be applied in addition to or instead of a blur filter to smooth surfaces.

Figure 4:
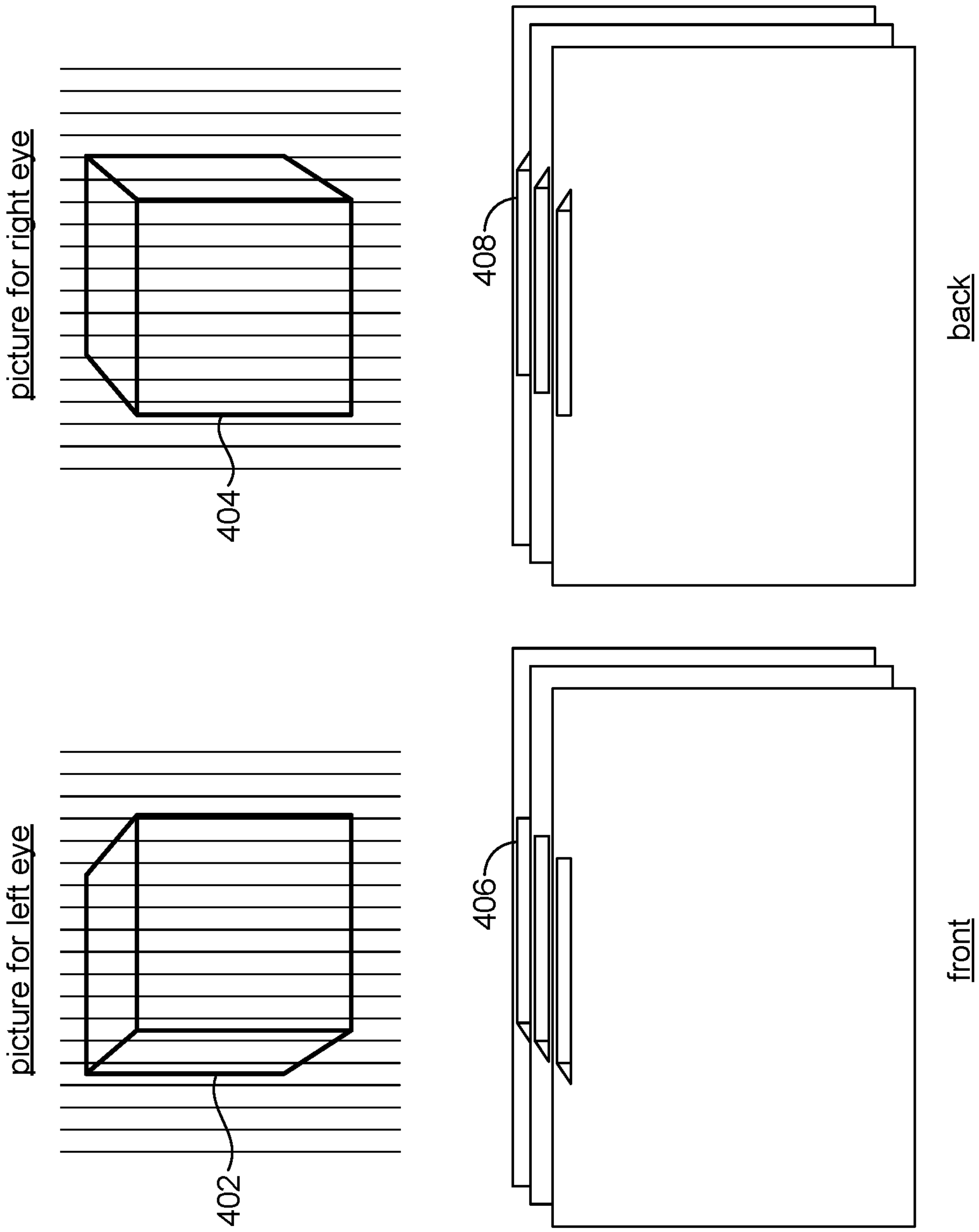
FIG. 4 provides an example of image slicing.

At block 206, the set of images (e.g., the left-eye image, the right-eye image, and/or the center image) are sliced or divided into portions. In this regard, the images are divided into slices or portions such that a slice or portion of each image can be printed on different pages of the multi-page document. By way of example only, and with reference to FIG. 4, assume a stereo pair of images is generated, a left-eye image 402 and a right-eye image 404. Each of the left-eye image 402 and the right-eye image 404 can be divided into various slices or portions, generally referred to herein as image slices or image portions. In this example, the slices are delineated using the vertical lines through the left-eye image 402 and the right-eye image 404. As described herein, the image slices of the left-eye image 402 can be printed onto the front edge 406 of the longer pages in a multi-page document such that the left eye views the left-eye image. Similarly, the image slices of the right-eye image 404 can be printed onto the back edge 408 of the longer pages in the multi-page document such that the right eye views the right-eye image. Viewing the left-eye image on one edge of pages and the right-eye image on the other edge of pages provides a three-dimensional effect of the image.

The number of image slices and/or the size of the image slices may be determined in any number of ways. As one example, assume a page thickness is 0.1 mm. In some cases, an image may be divided into more than 0.1 mm portions and be printed on the longer pages such each longer page has some overlap of slices from the image. For instance, overlap of image slices may be advantageous as eyes are not positioned in a fixed position (e.g., eyes might be slightly left of slightly right of the multi-page document). As another example, a number of pages for which print is desired (e.g., long pages), the thickness of each page, and/or the difference in distance between the shorter-width pages and the longer-width pages may be used to determine the size of the image slice to print on pages (e.g., each long page to obtain print).

Figure 5:
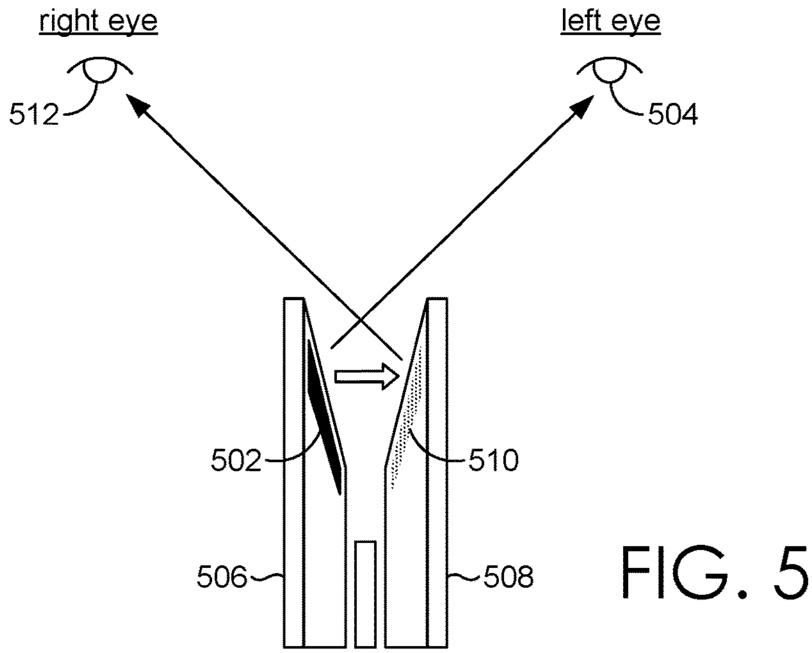
FIG. 5 provides an example of an interreflection effect between pages.

At block 208, the sliced images are adjusted to optimize three-dimensional effect. In this regard, in some implementations, the image slices are adjusted or edited to provide a more effective three-dimensional effect. As one example, image slices (e.g., to be printed on the front edge of various pages) may be adjusted to account for reflection of counter images slices (e.g., to be printed on the back edge of various pages). Stated differently, a reflection or shadow created from a particular image slice may be offset, thereby referred to as reflection offsetting or image offsetting. As the pages of the multi-page document are close in proximity from one another, one side of the image can result in a shadow or reflection on the counter page. As such, the right eye of a viewer may see an image for the left eye through the shadow or reflection, and vice versa. For example, and with reference to FIG. 5, assume image slice 502 is intended to be viewed by the left eye 504. Based on the proximity of the pages 506 and 508, the image slice 502 results in a blurry shadow or reflection 510 on page 508. As such, the right eye 512 of a viewer can see at least some aspects on page 508 related to the image slice 502 generated for the left eye. Adjusting image slices to offset shadow or reflection reduces this interreflection and, thereby provides a more effective three-dimensional effect.

In one embodiment, interreflection can be minimized by modifying an image slice for an edge (e.g., front edge of a page) to include an inverted image of the counter image slice to be printed on the edge of an adjacent page (e.g., back edge of adjacent page), which may also be referred to herein as reflection or image offsetting. A counter image slice is used to herein to describe an image slice on an adjacent page that faces a particular image slice on another page. In implementation, an image slice for a particular page edge (e.g., front edge of a page) may be adjusted to include an inverse of the image slice on the counter page (e.g., back edge of an adjacent page). As can be appreciated, in some implementations, an algorithm may be used to compute the effect of the light and optimize for uniformity of the light.

In some cases, the inverted image is blurred to simulate the effect. In this regard, the image slice to print on a page edge is the initial image slice for the page edge along with a blurred inverse of the image slice on the counter page edge. In this regard, a left-eye image can be inverted and blurred to adjust a right-eye image on an adjacent page, and a right-eye image can be inverted and blurred to adjust a left-eye image on an adjacent page.

Figure 6A:
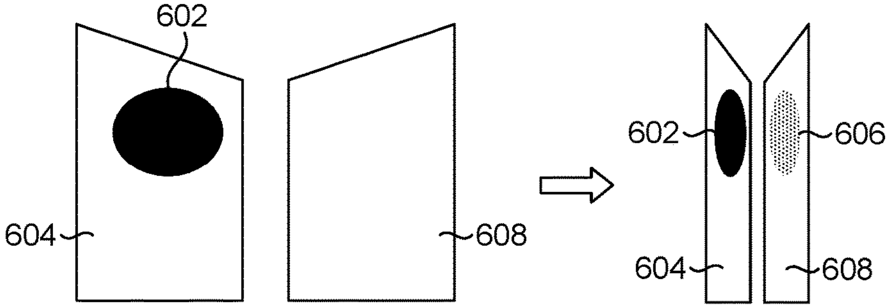
FIGS. 6A and 6B provide examples of interreflection and offsetting such interreflection.
Figure 6B:
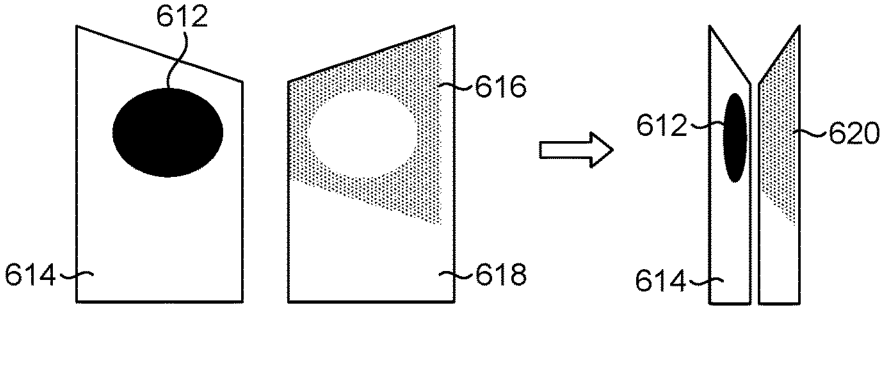

By way of example, and with reference to FIG. 6A, assume a circle 602 is printed on one long side edge of a page 604. While the left eye is intended to see the circle 602 on page 604, when pages 604 and 608 are positioned near one another, a reflection 606 of the circle 602 is produced on the adjacent or counter page 608 due to the proximity of the page 602 and 604 (e.g., along with the short page(s) interleaved in between the long pages). In particular, light bounces or reflects from page 604 to the counter page 608, resulting in the color from page 604 reflecting on counter page 608 (e.g., due to radiosity or light transport). As such, in embodiments herein, as shown in FIG. 6B, for circle 612 to be printed on one long side edge of page 614, a blurred, inverted image 616 can be generated and printed on an adjacent or counter edge of page 618. As shown in FIG. 6B, when the pages 614 and 618 are positioned near each other, the inverted image 616 on page 618 and the reflection generated from circle 612 onto the page offset each other, as illustrated at 620.

As can be appreciated, in cases in which image slices are intended to be printed on both sides of pages of a multi-page document (e.g., on the front and back edges of pages), the image slice to be printed may be composited or aggregated with the inverted image slice of the counter page. In this way, two adjacent pages facing each other include the image slice to be printed on the corresponding page as well as the inverted image from the counter page (e.g., blurred). Stated differently, a left-eye image slice for a front edge of a page includes the left-eye image slice (or a variation thereof) along with an inverted right-eye image slice generated from a back edge of a counter page, and vice versa.

In some cases, in compositing an image slice and an inverted image slice for a page, the inverted image (e.g., blurred inverted image) may be overlaid on an original image intended for a page. In other cases, the two images may be blended to generate a composite image for printing. A blend functionality can mix the pixels of the two images (e.g., an initial image slice for a page and an inverted image of the counter page). One example of a blend mode is a multiply blend mode, which may produce a darker effect. Another example of a blend mode is soft light blend mode, which can increase the contrast. Other functionalities may be used to aggregate the images or generate a composite image, such as, for example, using a layer mask with a gradient tool, using opacity, and/or the like.

In alternative embodiments, rather than printing a left-eye image and a right-eye image on two page edges facing each other, the left-eye image and the right-eye image can be printed in different counter page pairs. For example, for a first pair of pages that face each other, a left-eye image may be targeted on the front edge of the first page, and no image initially targeted on the back edge of the second page. In this way, the left-eye image for the front edge of the first page is unaltered as there is no image on the counter page, and the back edge of the second page includes the blurred inverted image of the left-eye image. Continuing with this example, for a second pair of sequential pages that face each other, a right-eye image may be targeted on the back edge of the second page, and no image initially targeted on the front edge of the first page. In this pair of pages, the right-eye image for the back edge of the second page is unaltered as there is no image on the counter page, and the front edge of the first page includes the blurred inverted image of the right-eye image.

As can be appreciated, such image offsetting or adjusting to account for, or compensate for, interreflection can decrease contrast. In particular, offsetting shadow or reflection on a page can reduce the contrast of the image in its entirety. In some cases, contrast reduction may be undesired. As such, to avoid or minimize contrast reduction, in some implementations, the darkness of the offsetting or inverted image may be reduced. As one example, to do so, the inverted or offsetting image could be removed, or not applied, in particular areas or pages of the multi-page document. In this way, a portion of an image slice and/or a portion of various image slices of the set of image slices may forego application of the reflection or shadow offsetting. Avoiding application of reflection offsetting can be particularly effective in portions of the image that do not need as much offsetting.

Figure 7:
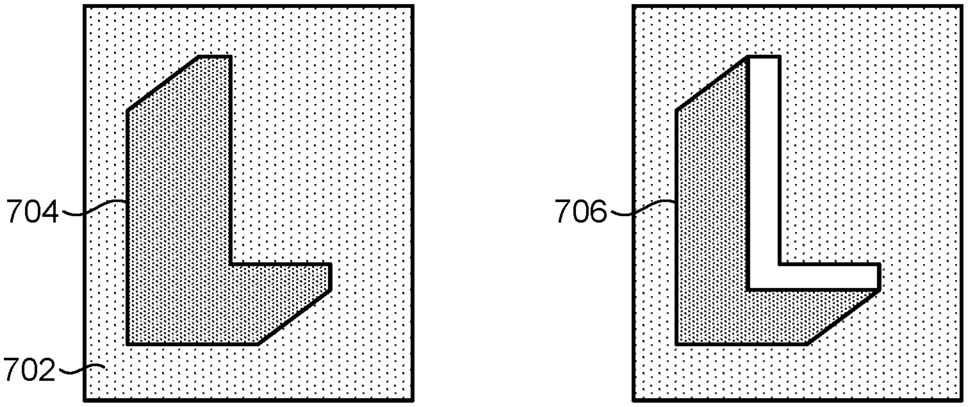
FIG. 7 provides an example of selective use of offsetting reflection.

By way of example only, and with reference to FIG. 7, an image with offsetting applied 702 is shown. As illustrated, the contrast associated with the letter "L" is reduced due to the reflection offsetting applied. Now assume a portion of the image is designated (e.g., by highlighting or selection) to forego reflection offsetting. For instance, in this example, the top portion 704 of the extended letter may be designated to forego reflection offsetting to enhance the contrast. As such, based on the designation to forego reflection offsetting of the top portion 704 of the extended letter, the offsetting image (e.g., blurred, inverted image) is not applied in association with those portions, resulting in the image 706 appearing with greater contrast. Portions of an image for which foregoing or deleting image offsetting is desired may be selected in any number of ways. For example, in some cases, areas of more valuable contrast may be automatically detected. In other cases, a user may specify areas to have higher contrast such that image offsetting is not applied in those areas.

Figure 8:
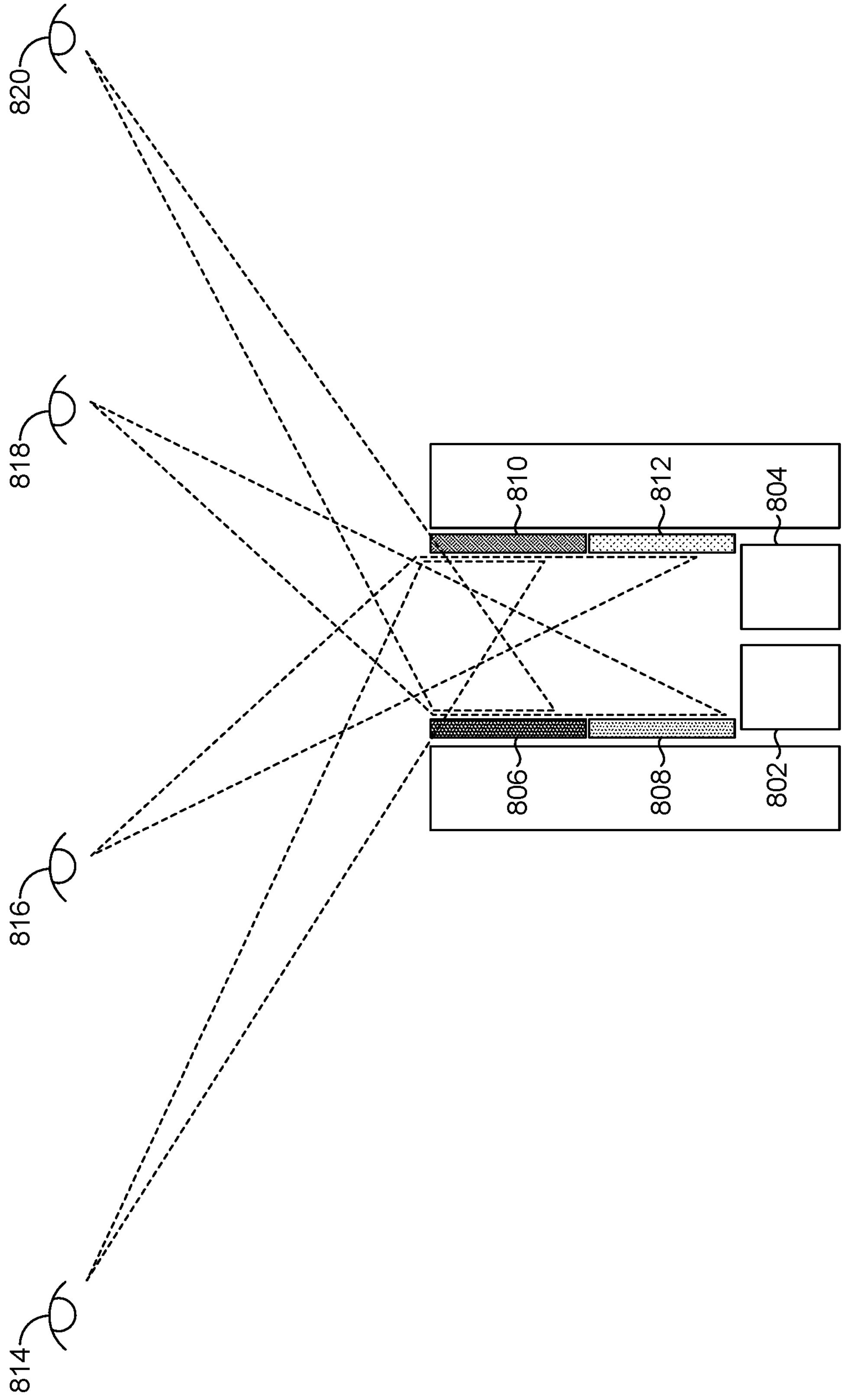
FIG. 8 provides an example of using color in association with a three-dimensional effect.

In some embodiments, block 208 of adjusting image slices may include adding color. For instance, color may be added to image slices such that the color associated with the image changes as the perspective of the image changes. By way of example only, for an image slice, different colors may be used so that the color changes depending on the location from which a viewer is positioned. As an illustration, and with reference to FIG. 8, FIG. 8 includes a first image slice 802 and a second image slice 804. Assume the first image slice 802 includes a blue color 806 and a yellow color 808, while the second image slice 804 includes a red color 810 and a green color 812. The color viewed the by the user will depend on the perspective relative to the multi-page document. For example, a viewer at position 814 views the second image slice 804 as the red color 810. As the viewer moves to position 816, the second image slice 804 is presented in the green color 812 and red color 810. On the other hand, the viewer at position 818 views the first image slice 802 as the yellow color 808 and blue color 806, and at position 820 views the first image slice 802 as the blue color 806. The color may be added in any number of ways. As one example, an image slice may be multiplied in a desired color space to obtain a color image. Color may be applied across the set of image slices, or may be applied differently to various image slices, depending on the color desired to appear to a viewer. Further, although discussed herein as applying color to the image slices, as can be appreciated, color may be applied to the stereo images before image slicing.

Returning to FIG. 2, at block 210, the sliced images, or the adjusted image slices, to print on pages of the multi-page document are aligned for printing on the corresponding page. In this regard, the images may be aligned to particular pages to which the images will print and/or placement of the images on the pages. In embodiments, the sliced image to print on a page is positioned slightly away from the edge of the page such that a thin band is left between the edge of the page and the location at which the image is printed. In this way, the very edge of the page remains blank such that nothing is printed in that region. For example, and with reference to FIG. 1B, as shown, a small gap 142 is provided between the edge of the page and the printing of the image slice 144. Advantageously, the gap between the edge of the paper and the printed image slice reduces the likelihood the opposite, or unintended eye, will see the printed image. For example, assume the right eye 132 is intended to see the image slice 130. Placing the sliced image slightly away from the edge of the paper can prevent the left eye 136 from viewing the sliced image 130.

Figure 9:
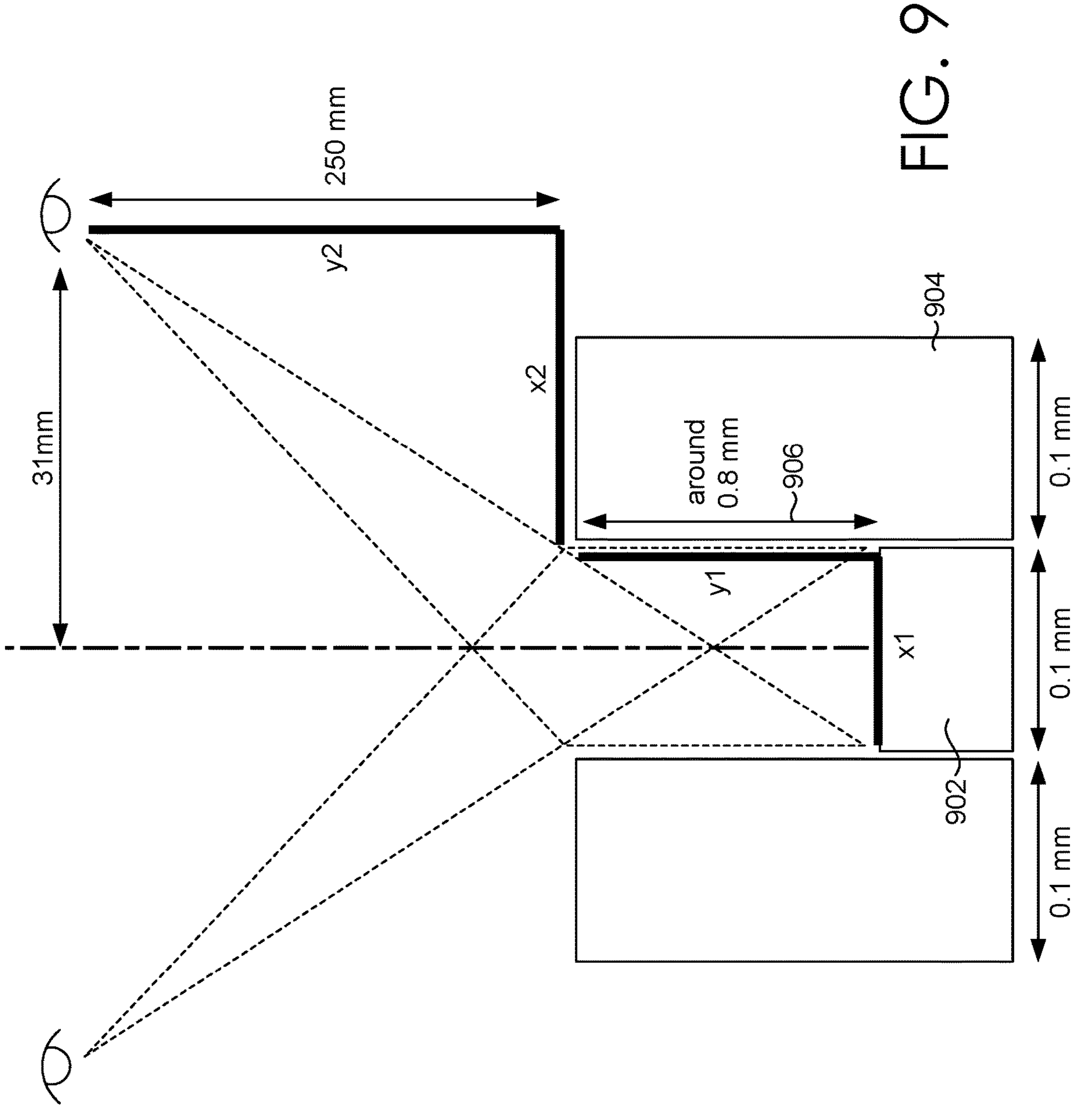
FIG. 9 provides an example of determining dimensions of image slices.

In some embodiments, the width of the image to print on a page edge may be based on the distance between the long page edge and the short page edge. As described, the shorter pages are interleaved between the longer pages and intended to enable viewing of the images printed on the longer pages. The width of the short pages may be determined based on assumed or desired distance of eyes from the multi-page document. For example, an average length or distance of eyes from a multi-page document may be determined or estimated. Based on that distance, a determination can be made as to the size of the shorter page as compared to the longer page. By way of example, and with reference to FIG. 9, assume a standard letter size of paper is used, having a page depth of 0.1 mm. Assume further that eye distance from the multi-page document is assumed to be 250 mm, and the distance between the eye and the center viewing line is 31 mm. In such a case, the difference desired between the shorter page 902 and the longer page 904 is 0.8 mm, as illustrated at 906. In this example, the width of the image to print on the page edge can fill that 0.8 mm area (e.g., minus the small gap nearest the edge of the page). In some cases, the image slice width can be greater than the identified distance such that the image covers more width than the distance of gap between the shorter page and the longer page.

Figure 10A:
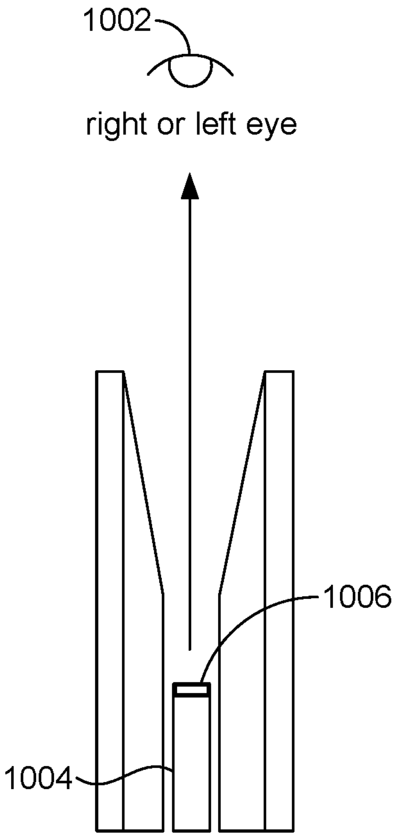
FIGS. 10A-10B provides an example of printing in association with the shorter pages of the multi-page document.
Figure 10B:
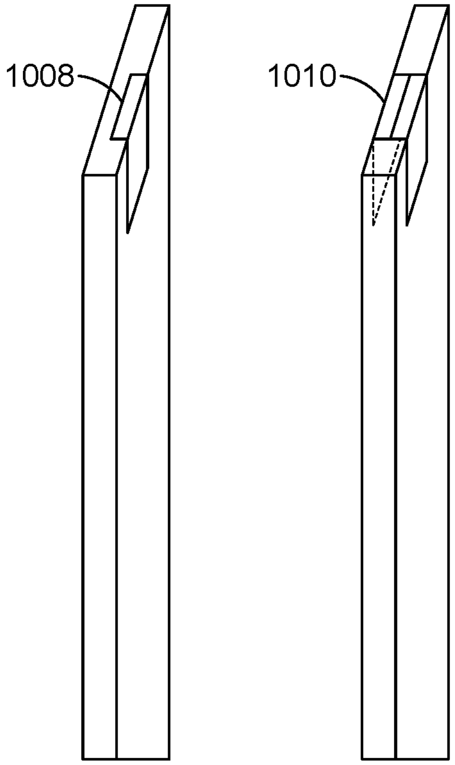

As described, in some embodiments, center images may be printed on the shorter pages. In this regard, in addition to printing stereo images on the longer pages, center images can be printed on the edge of the shorter pages such that the image is also displayed between the longer pages. With the shorter pages, the print is positioned on the depth or thickness portion of the page. By way of example, and with reference to FIG. 10A, when a right eye or left eye 1002 is aligned to the multi-page document angle or direction, the eye sees the edge of the shorter page(s) 1004. As such, the edge of the shorter page can be printed with a center image 1006 to enhance the three-dimensional effect. To print the very edge, or thickness, of the paper, one side 1008 or both sides 1010 of the page could be printed until the edge, as shown in FIG. 10B.

Figure 11:
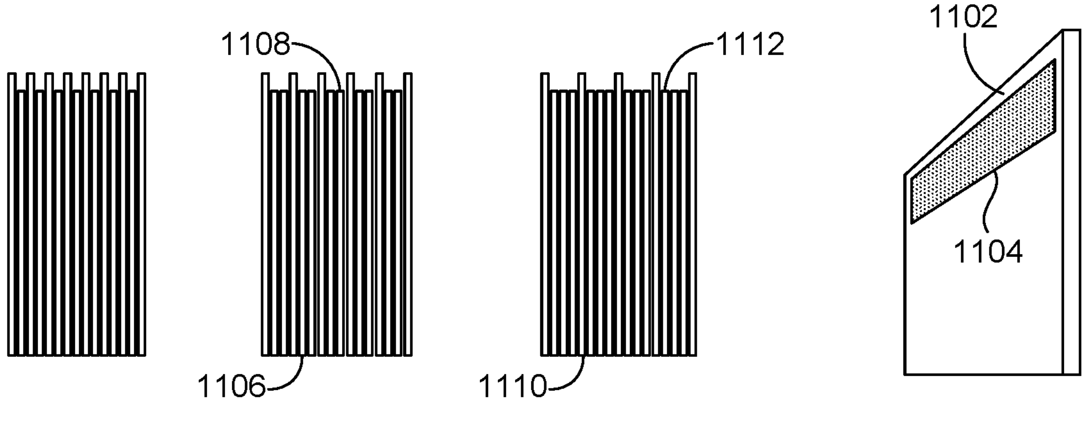
FIG. 11 provides an example of various numbers of short pages inserted between pairs of long pages in a multi-page document.
Figure 12:
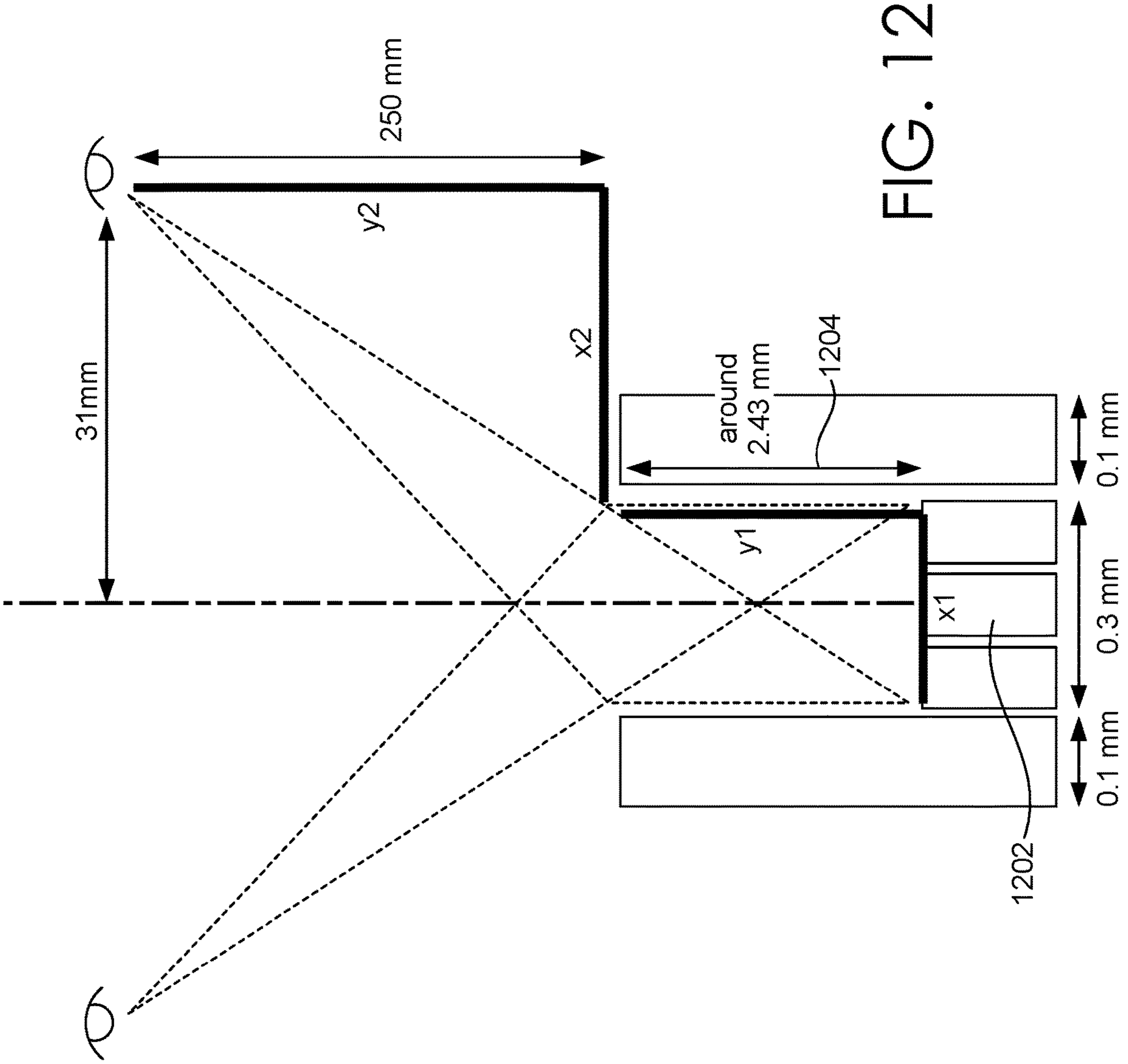
FIG. 12 provides an example of determining dimensions of image slices based on multiple short pages inserted between pairs of long pages in a multi-page document.

Although a single page interleaved between a pair of longer pages is generally discussed herein, the number of shorter pages inserted between each pair of longer pages may be any number. For example, and with reference to FIG. 11, in some implementations, a small gap 1102 exists between the edge of the page and the printed image 1104. Such a thin line (e.g., white line) can result in a lower contrast. As such, the number of longer pages could be reduced by adding more shorter pages. For example, in multi-page document 1106, two shorter pages 1108 are presented between each pair of longer pages. In multi-page document 1110, three shorter pages 1112 are presented between each pair of longer pages. With reference to FIG. 12, using three shorter pages 1202 (each 0.1 mm in thickness), the distance 1204 between the longer and the shorter pages is adjusted to be around 2.43 mm.

As more shorter pages are added between pairs of longer pages, the interreflection or shadow effects may become less visible. Reducing the number of longer pages, however, may result in a lower resolution. As such, the number of shorter pages interleaved between pairs of longer pages may depend on the desired effect. In some embodiments, to ensure mechanical strength of the pages, the page depth may be selected or adjusted. For example, slightly thicker pages may be used for the longer pages and thinner pages for the shorter pages.

At block 212, the images (e.g., adjusted sliced images) are printed on the pages of the multi-page document. In this regard, the various left-eye image and right-eye images, as modified or adjusted, are printed on the front edge and/or back edge of the long pages of the multi-page document, in accordance with the determined alignment. In one example, each adjusted left-eye image is printed on one side of a respective page of the multi-page document, and each adjusted right-eye image is printed on another side of a respective page of the multi-page document. In embodiments, the center images are printed on the edges of the short pages of the multi-page document. The long pages and short pages can be interleaved as appropriate, if needed after printing.

Figure 13:
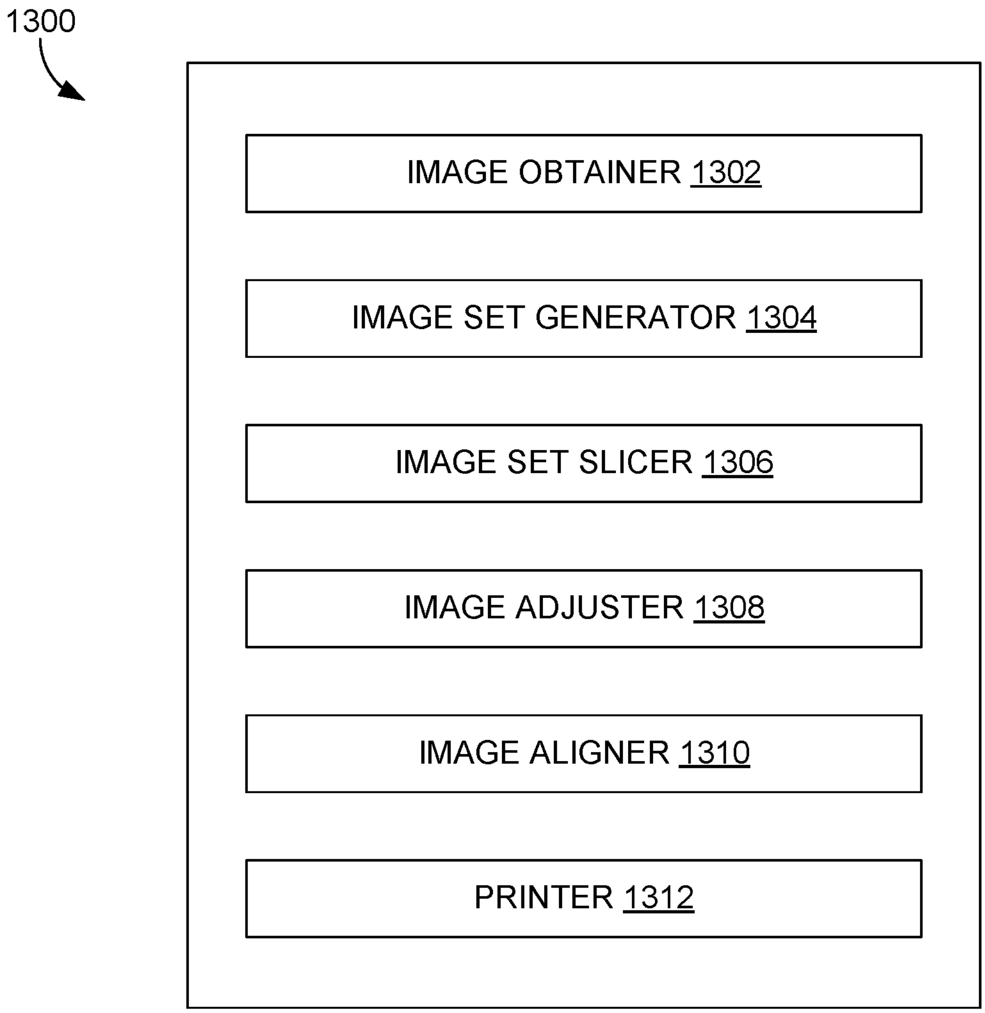
FIG. 13 provides an example system for facilitating a three-dimensional effect on an edge of a multi-page document.

Turning now to FIG. 13, FIG. 13 depicts an example configuration of an operating environment in which some implementations of the present disclosure can be employed. In particular, FIG. 13 includes an example system or device(s) used to facilitate three-dimensional effects on edges of multi-page documents, in accordance with embodiments of the present technology. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 1300 shown in FIG. 13 is only one example of one suitable operating environment. Each of the components shown in FIG. 13 may be implemented via any type of computing device, such as one or more of computing device 1500 described in connection to FIG. 15, for example. It should be understood that any number of user devices, client devices, servers, and other components may be employed within operating environment 1300 within the scope of the present disclosure. Each may comprise a single device or multiple devices cooperating in a distributed environment.

The system 1300 can include hardware and/or software operable to perform the described functions. As shown in FIG. 13, the system includes an image obtainer 1302, an image set generator 1304, an image set slicer 1306, an image adjuster 1308, an image aligner 1310, and an image printer 1312.

Image obtainer 1302 is generally configured obtain an image desired to be displayed, as having a three-dimensional effect on the edge of a multi-page document. As described, the image may include any type of text, graphics, pictures, etc. In some cases, the image may be text and, in such cases, the font, size, color, spacing, etc. can be provided therewith (e.g., based on a user selection). In some cases, the image may be modified so as to appear in three dimensions, in accordance with embodiments described herein. In such cases, the image obtainer 1302, or other component, may modify the image such that is appears in three dimensions, for example, using orthographic projection, three-point perspective projection, or one-point perspective projection.

The image set generator 1304 is generally configured to generate a set of images, from the obtained image, to correspond with different eye positions. For example, the obtained image (e.g., the modified image) to display on the edge of the multi-page document can be rendered to correspond with right and left eye positions. In this regard, a stereo pair of images can be created, with one view intended for the left eye and another view intended for the right eye. In some embodiments, the image set generator 1304 also generates a center image, for example, for use on the shorter pages of the multi-page document.

In some cases, the image set generator 1304, or other component, may apply a blur filter (e.g., a small vertical blur filter) to the various images (e.g., left-eye image, right-eye image, and/or center image). A blur filter can smooth transitions, for example, by averaging the color values of pixels next to hard edges of defined lines and shaded areas, thereby preventing or reducing aliasing. Blur filters may be of any type, such as, for example, a box blur, a Gaussian blur, etc.

The image set slicer 1306 is generally configured to slice or divide the set of images into image slices. In this regard, the images (e.g., the left-eye image, the right-eye image, and/or the center image) are divided into slices or portions such that a slice or portion of each image can be printed on different pages of the multi-page document. As described herein, the image slices of the left-eye image can be printed onto one edge (e.g., front edge) of the longer pages in a multi-page document such that the left eye views the left-eye image, and the image slices of the right-eye image can be printed onto another edge (e.g., the back edge) of the longer pages in the multi-page document such that the right eye views the right-eye image. Viewing the left-eye image on one edge of pages and the right-eye image on the other edge of pages provides a three-dimensional effect of the image.

The number of image slices and/or the size of the image slices may be determined in any number of ways. For example, a number of pages for which print is desired (e.g., long pages), the thickness of each page, and/or the difference in distance between the shorter-width pages and the longer-width pages may be used to determine the size of the image slice to print on pages (e.g., each long page to obtain print).

The image adjuster 1308 is generally configured to adjust the sliced images to optimize three-dimensional effect. In this regard, in some implementations, the image slices are adjusted or edited to provide a more effective three-dimensional effect. As one example, image slices (e.g., to be printed on the front edge of various pages) may be adjusted to account for reflection of counter images slices (e.g., to be printed on the back edge of various pages). Adjusting image slices to offset shadow or reflection reduces this interreflection and, thereby provides a more effective three-dimensional effect.

In one embodiment, interreflection can be minimized by modifying an image slice for an edge (e.g., front edge of a page) to include an inverted image of the counter image slice to be printed on the edge of an adjacent page (e.g., back edge of adjacent page). In implementation, an image slice for a particular page edge (e.g., front edge of a page) may be adjusted, by the image adjuster 1308, to include an inverse of the image slice on the counter page (e.g., back edge of an adjacent page). In some cases, the inverted image is blurred to simulate the effect. In this regard, the image slice to print on a page edge is the initial image slice for the page edge along with a blurred inverse of the image slice on the counter page edge.

As can be appreciated, in cases in which image slices are intended to be printed on both sides of pages of a multi-page document (e.g., on the front and back edges of pages), the image slice to be printed may be composited or aggregated with the inverted image slice of the counter page. In this way, two adjacent pages facing each other include the image slice to be printed on the corresponding page as well as the inverted image from the counter page (e.g., blurred). In some cases, in compositing an image slice and an inverted image slice for a page, the inverted image (e.g., blurred inverted image) may be overlaid on an original image intended for a page. In other cases, the two images may be blended to generate a composite image for printing.

As can be appreciated, in some cases, to avoid or minimize contrast reduction resulting from image offsetting, in some implementations, the darkness of the offsetting or inverted image may be reduced. As one example, to do so, the inverted or offsetting image could be removed, or not applied, in particular areas or pages of the multi-page document. In this way, a portion of an image slice and/or a portion of various image slices of the set of image slices may forego application of the reflection or shadow offsetting. Avoiding application of reflection offsetting can be particularly effective in portions of the image that do not need as much offsetting.

In some embodiments, the image adjuster 1308 may be configured to adjust image slices to vary color. For instance, color may be added to image slices such that the color associated with the image changes as the perspective of the image changes. By way of example only, for an image slice, different colors may be used so that the color changes depending on the location from which a viewer is positioned. Color may be applied across the set of image slices, or may be applied differently to various image slices, depending on the color desired to appear to a viewer.

The image aligner 1310 is generally configured to align the image slices, or the adjusted image slices, for printing on the corresponding pages of the multi-page document. In this regard, the images may be aligned to particular pages to which the images will print and/or placement of the images on the pages. For example, a first image slice of a set of image slices may be aligned with a first page of a multi-page document and subsequent image slices can be distributed sequentially to subsequent pages. In embodiments, the sliced image to print on a page is positioned slightly away from the edge of the page such that a thin band is left between the edge of the page and the location at which the image is printed. In this way, the very edge of the page remains blank such that nothing is printed in that region.

The image aligner 1310 may also determine the size of the image to print on the page edge. For example, the image aligner 1310 may determine (e.g., automatically or based on user input) a distance that an image slice(s) printed on each page extends toward the center of the page. In some embodiments, the width of the image to print on a page edge may be based on the distance between the long page edge and the short page edge. As described, the shorter pages are interleaved between the longer pages and intended to enable viewing of the images printed on the longer pages. The width of the short pages may be determined based on assumed or desired distance of eyes from the multi-page document. For example, an average length or distance of eyes from a multi-page document may be determined or estimated. Based on that distance, a determination can be made as to the size of the shorter page as compared to the longer page.

In embodiments, the image aligner 1310 may also align center images to print on the shorter pages. In this regard, in addition to printing stereo images on the longer pages, center images can be printed on the edge of the shorter pages such that the image is also displayed between the longer pages. The image aligner 1310 may also determine the number of shorter pages to insert bettween each pair of longer pages. As more shorter pages are added between pairs of longer pages, the interreflection or shadow effects may become less visible. Reducing the number of longer pages, however, may result in a lower resolution. As such, the number of shorter pages interleaved between pairs of longer pages may depend on the desired effect.

The image printer 1312 is generally configured to print the images (e.g., adjusted image slices) on the pages of the multi-page document. In this regard, the various left-eye image and right-eye images, as modified or adjusted, are printed on the front edge and/or back edge of the long pages of the multi-page document, in accordance with the determined alignment. In one example, each adjusted left-eye image is printed on one side of a respective page of the multi-page document, and each adjusted right-eye image is printed on another side of a respective page of the multi-page document. In embodiments, the center images are printed on the edges of the short pages of the multi-page document. The long pages and short pages can be interleaved as appropriate, if needed after printing. In some cases, the image slices can be printed on sequential pages, but need not be the case.

The image printer 1312 may include any apparatus or machine that can print the pages or perform a print outputting function. As described, the image printer 1312 can print images, such as image slices, in a margin adjacent or very close to an edge of the page. As can be appreciated, the images may be printed in coordination with other text or graphics presented on the page, for example, the central region of the page. In this regard, the central region of the page and the image slice printed adjacent to the edge of the page can be printed in one printing operation.

Figure 14:
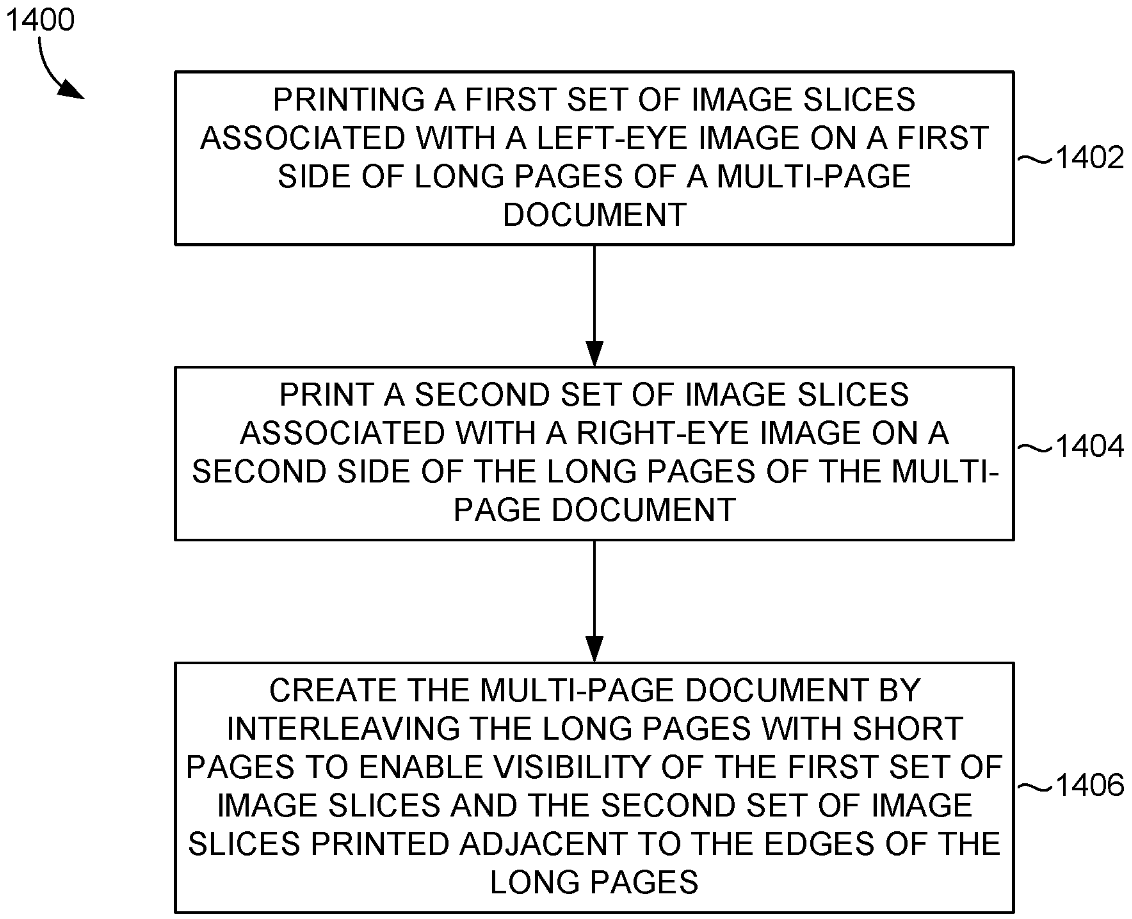
FIG. 14 provides an example flow for facilitating a three-dimensional effect on an edge of a multi-page document.

Turning to FIG. 14, FIG. 14 provides an example flow for facilitating a three-dimensional effect on an edge of a multi-page document. Initially, as indicated at block 1402, a first set of image slices associated with a left-eye image is printed on a first side of long pages of a multi-page document. The first set of image slices is printed adjacent to edges of the long pages. At block 1404, a second set of image slices associated with a right-eye image is printed on a second side of the long pages of the multi-page document. The second set of image slices printed adjacent to the edges of the long pages. At block 1406, the multi-page document is created by interleaving the long pages with short pages to enable visibility of the first set of image slices and the second set of image slices printed adjacent to the edges of the long pages. Various other aspects may be included to generate a multi-page document having a three-dimensional effect, as described herein.

Figure 15:
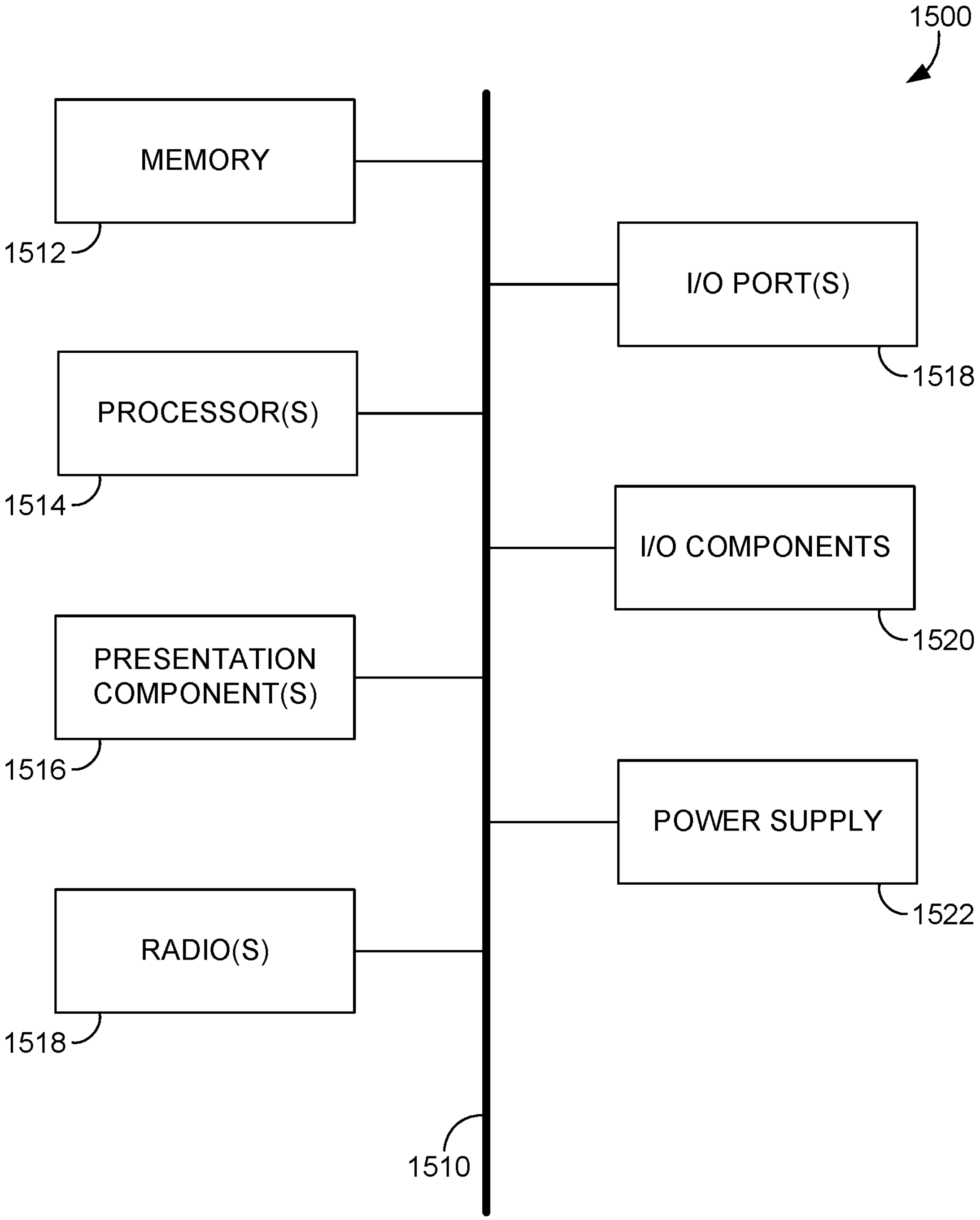
FIG. 15 is a block diagram of an example computing device in which embodiments of the present disclosure may be employed.

Having described embodiments of the present technology, FIG. 15 provides an example of a computing device in which embodiments of the present invention may be employed. Computing device 1500 includes bus 1510 that directly or indirectly couples the following devices: memory 1512, one or more processors 1514, one or more presentation components 1516, input/output (I/O) ports 1518, input/output components 1520, and illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 15 is merely illustrative of an exemplary computing device that can be used in connection with one or more embodiments of the present invention. Distinction is not made between such categories as “workstation,” “server,” “laptop,” “handheld device,” etc., as all are contemplated within the scope of FIG. 14 and reference to “computing device.”

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1512 includes computer storage media in the form of volatile and/or nonvolatile memory. As depicted, memory 1512 includes instructions 1524. Instructions 1524, when executed by processor(s) 1514 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, any type of printing device (e.g., laser printer, digital press, inkjet printer, LED/LCD printers, or the like), etc. I/O components 1520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1500. Computing device 1500 may be equipped with depth cameras, such as stereoscopic camera systems, infrared camera systems, RGB camera systems, and combinations of these, for gesture detection and recognition. Additionally, computing device 1500 may be equipped with accelerometers or gyroscopes that enable detection of motion. The output of the accelerometers or gyroscopes may be provided to the display of computing device 1500 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:

printing a first set of image slices associated with a left-eye image on a first side of long pages of a multi-page document, the first set of image slices printed adjacent to edges of the long pages;

printing a second set of image slices associated with a right-eye image on a second side of the long pages of the multi-page document, the second set of image slices printed adjacent to the edges of the long pages; and creating the multi-page document by interleaving the long pages with short pages to enable visibility of the first set of image slices and the second set of image slices printed adjacent to the edges of the long pages.

2. The method of claim 1, wherein the first set of image slices are generated from a first image of a stereo pair constructed for a left eye to view, and the second set of image slices are generated from a second image of the stereo pair constructed for a right eye to view.

3. The method of claim 1, wherein the first side of long pages comprises a front side of the long pages and the second side of the long pages comprises a back side of the long pages.

4. The method of claim 1, wherein the long pages have a greater width than the short pages.

5. The method of claim 1, wherein one or more short pages are inserted between each pair of long pages.

6. The method of claim 1, wherein a gap is positioned between the edges of the long pages and the printed first set of images slices and second set of images slices.

7. The method of claim 1, wherein the first set of image slices and the second set of image slices are printed in one or more colors.

8. The method of claim 7, wherein the first set of image slices printed on the first side of long pages includes a first color and a second color, such that the color changes as a viewing perspective changes.

9. A method comprising:

obtaining an image desired to be displayed, with a three-dimensional effect, on an edge of a multi-page document;

generating a set of images, from the obtained image, to correspond with different eye positions, the set of images including a left-eye image and a right-eye image;

dividing each image of the set of image into a set of image slices, including a first set of image slices associated with the left-eye image and a second set of image slices associated with the right-eye image; and causing printing of the first set of image slices on a first side of long pages of the multi-page document and the second set of image slices on a second side of the long pages of the multi-page document, wherein the multi-page document includes short pages interleaved between the long pages to enable visibility of the first set of image slices and the second set of image slices printed adjacent to edges of the long pages.

10. The method of claim 9, wherein the left-eye image and the right-eye image comprise a stereo pair of images constructed for a left eye to view and a right eye to view, respectively.

11. The method of claim 9, wherein the first side of the long pages comprises a front side of the long pages, and the second side of the long pages comprises a back side of the long pages.

12. The method of claim 9, wherein one or more short pages are inserted between each pair of long pages.

13. The method of claim 9, wherein a gap is positioned between the edges of the long pages and the printed first set of image slices and the second set of image slices.

14. The method of claim 9, wherein the image slices, of the first set of image slices, include a reflection offset to offset a reflection of corresponding counter image slices.

15. The method of claim 9 further comprising causing printing of a third set of image slices on edges of the short pages, the third set of image slices associated with a center image.

16. One or more computer-readable media having a plurality of executable instructions embodied thereon, which, when executed by one or more processors, cause the one or more processors to perform a method comprising:

dividing a stereo left-eye image into a first set of image slices and a stereo right-eye image into a second set of image slices;

aligning a first image slice, of the first set of image slices, on a back side edge of a first long page of a multi-page document and a second image slice, of the second set of image slices, on a front side edge of a second long page of the multi-page document, wherein the first image slice faces the second image slice;

adjusting the first image slice to offset reflection from the second image slice facing the first image slice;

adjusting the second image slice to offset reflection from the first image slice facing the second image slice; and providing the adjusted first image slice for printing on the back side edge of the first long page and the adjusted second image slice for printing on the front side edge of the second long page to create the multi-page document.

17. The computer-readable media of claim 16, wherein the multi-page document includes at least one short page between the first long page and the second long page, wherein the at least one short page enables visibility of the adjusted first image slice and the adjusted second image slice.

18. The computer-readable media of claim 16, wherein adjusting the first image slice to offset reflection from the second image slice comprises:

generating an inverted image corresponding with the second image slice; and compositing the first image slice with the inverted image corresponding with the second image slice.

19. The computer-readable media of claim 18, wherein the inverted image is a blurred inverted image corresponding with the second image slice.

20. The computer-readable media of claim 18, wherein compositing the first image slice with the inverted image corresponding with the second image slice comprises blending pixels of the first image slice with pixels of the inverted image.

* * * * *